Patented May 29, 1951

2,554,870

UNITED STATES PATENT OFFICE 2,554,870

FULLY CURED OLIVE BRINE TREATED FOOD GLYCERIDE OILS AND METHOD OF PRODUCING SAME

Sidney Musher, New York, N. Y., assignor to Musher Foundation Incorporated, New York, N. Y., a corporation of New York No Drawing. Application November 14, 1947, Serial No. 786,164

20 Claims. (Cl. 99—118)

The present invention relates to the production of an intensified olive flavor and aroma in low flavored or deodorized olive and vegetable oils as well as to oils having such an intensified olive flavor and aroma produced particularly by special processing of such oils with olive brine produced from enzyme activated olives or with olive brine remaining after ripe olives have been allowed to cure in the brine for a period of at least about 6 months under normal temperature conditions.

An object of the present invention is therefore to greatly enhance the flavor and aroma of substantially flavorless glyceride oils, developing in them a highly desirable, distinctive and pronounced olive flavor and aroma at low cost, the flavor and aroma of such oil being in many cases the equivalent in intensity to that of a pure olive oil.

A further object is to provide an oil with an intensified olive flavor that has none of the objectionable physical characteristics of olive oil and which can readily be used in the manufacture of mayonnaise, for French dressing, in the preparation of canned fishery products and particularly for use as a salad oil as well as for other culinary purposes.

A further object is the preparation of such an intensified olive flavored oil by the use of products normally having no value and normally discarded so that the intensified olive flavor is developed by an ingredient of substantially no cost or of minute cost.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the procedures of the present invention, ripe olives as removed from the tree are held in a sodium chloride brine solution for a period of at least about 6 months in order to allow the olives to cure completely while at the same time an enzymatic reaction takes place upon the olives producing a particular type of brine from these enzyme activated olives, which brine has been found to contain oil solubles of a highly desirable characteristic that can be imparted to glyceride oils of little or no flavor.

The brine removed from the 6 month completely cured ripe olives is, in accordance with the procedures of the present invention, thoroughly agitated with, for example, a refined vegetable oil such as refined corn oil, refined cottonseed oil, refined soybean oil, refined peanut oil, or even refined olive oil, etc., all of which are desirably in deodorized condition and have little or no flavor and odor of their own, after which thorough agitation the aqueous fraction or the brine freed of the oil solubles is removed from the oil and the oil thus obtained has a most pronounced and desirable olive aroma and flavor.

Any variety of ripe olives may be used for the brining or curing procedure. For example, ripe olives of the Manzanilla, Mission, Sevillano, or Escalano variety may be employed or ripe olives as produced in the Mediterranean districts including those from Italy, Greece, Spain, Tunis or other parts of Africa may be employed.

The ripe olives when taken from the trees are held in a sodium chloride brine solution of desirably at least 40° salometer reading and preferably a salometer reading of at least 55° to 60°. The olives, for example, may be placed into barrels with the bung of the barrel held loosely on the top to permit the curing and enzyme reactions to take place and every three or four days, particularly at the beginning of the brining process, the brine is tested for salometer reading and sufficient additional salt is added to maintain the salometer reading at the desired level, preferably at 55° to 60° reading.

These ripe olives are held in the brine for a period of at least about 6 months under normal temperature conditions. At the close of this period, the ripe olives will have become fully and completely cured, leaving a brine in which the olives are held that has the most desirable characteristics for use in accordance with the procedures of the present invention.

The ripe olives may be held in the brine for a longer period than 6 months and the brine of ripe olives cured for a year to 18 months is even more desirable. The time period herein specified is based upon holding the olives under about normal room temperature conditions. Where the olives are held at slightly higher temperatures as for example at 85° F. to 95° F., the time period may be shortened somewhat.

The term "fully cured" as used herein signifies a curing period of at least about 6 months under normal room temperature conditions.

The olives should not be subjected to a sufficiently elevated temperature treatment prior to the curing which would inactivate or kill the enzymes. For example, the olives should not be boiled or heated to a temperature of 180° F. or more as if the olives are subjected to an elevated temperature treatment either in the brine or before brining and before the enzyme reaction has taken place, the enhanced olive flavor of the present invention is not obtained.

The brine is then removed from these fully cured ripe olives and is added to and agitated with a refined deodorized vegetable or olive oil. The brine may be added in the amount of, for example, from 10% to 50% or more and desirably in the amount of between 20% and 30% against the weight of the oil. The brine removed after the curing period as set forth above is thoroughly mixed or agitated with the oil. Where desired the brine may be emulsified with the oil as by the use of an homogenizer or colloid mill although good agitation or rapid agitation is all that is required to produce a satisfactory result. The brine removed from the enzyme activated olives may, where desired, be subjected to flash pasteurization as, for example, by heating to a temperature of 180° F. or between 160° F. and 200° F. desirably for a flash period or for a period up to about one or two minutes or more. Furthermore the brine admixed with the oil or the homogenized combination may be subjected to flash pasteurization using the ordinary type of equipment employed in the flash pasteurization of milk. Neither the brine nor the olives should be subjected to the elevated temperature treatment until after the enzyme activation has taken place and until after the complete curing procedure has been completed.

The combination of the brine and the oil is then desirably subjected to centrifugalization as, for example, using the clarifier bowl of a centrifuge operated at between 6000 and 15,000 R. P. M., as a result of which the brine which has now been substantially freed of the oil solubles contained therein is separated from the oil. The oil may also be separated from the brine by gravity separation but the most highly desirable procedure is by the use of an oil clarifier or centrifuge which mechanically and immediately separates the brine from the oil.

The present invention relates to the complete curing of substantially whole ripe olives. The olives after the curing procedure may be placed into another brine and sold as such as in the case of the Greek style olives and it is only the brine which is separated from the olives that is employed in accordance with the procedures herein set forth.

Where desired, the brine obtained from the enzyme activated or fully cured ripe olives may be removed and used as herein set forth, following which the olives may be replaced in fresh brine and further curing may take place, after which the second lot of brine obtained from the olives may similarly be employed.

The oils that may be used for admixture with the brine include any variety of vegetable or glyceride oil such as peanut oil, sunflower seed oil, sesame oil, soybean oil, cottonseed oil, corn oil, etc., and are preferably utilized in refined deodorized condition. Where olive oil is employed, either virgin or refined but desirably refined and deodorized, the olive oil may be utilized for treatment with the brine and in any case the olive oil after treatment with the brine has an intensified olive flavor.

It has been found desirable to include with the oil either before or after admixture with the brine a small amount of less than 2% and desirably between 0.25% and 1% of dry degerminated crude corn oil. This crude corn oil is prepared by dry degerminating corn as distinguished from the wet milling method of removing the germ from the corn, which latter method involves the use of sulphurous acid. The dry milled corn germ is then subjected to expression by an Anderson expeller or solvent extraction and then the dry processed crude corn oil is added to the oil or admixed in the amount given to further enhance or emphasize the olive flavor.

Strangely, it has been found that although the crude dry degerminated corn oil has no flavor characteristics resembling in any manner that of olives, nevertheless where it is added to the oil before, during, or after admixture with the brine an even more emphasized olive flavor is obtained far in excess of what is obtained by the use of the brine alone.

During the complete curing of the ripe olives, as a result of which the brine develops the oil solubles which are imparted to the oil upon admixture, the color is reduced and very little or no color is imparted to the oil upon admixture with the brine.

An unusual feature of the present invention is that the oil thus obtained after treatment with the brine of fully cured ripe olives has an intense olive flavor and aroma. Nevertheless there is no olive oil present and the oil may be readily used, for example, in the manufacture of mayonnaise. The mayonnaise thus obtained has a highly desirable olive aroma and flavor characteristics and may be readily used for salad purposes.

As examples for the procedures herein set forth, although not limited to these specific examples, the following is given:

*Example I*

Ripe Mission olives as taken from the trees were immersed in a 45° sodium chloride brine and the brine was maintained at 45° salometer reading for a period of 60 days. The olives were then held in that brine for an additional 6 month period to allow the olives to become fully cured. At the close of this period the brine was removed from the fully cured ripe olives and to 100 pounds of refined deodorized corn oil 20 pounds of the brine was added. The combination was thoroughly agitated for a period of 10 minutes, following which the combination was put through a centrifuge clarifier to separate the oil from the brine, the oil now containing the oil solubles derived from the brine of the fully cured ripe olives. This oil from the centrifuge was found to contain 0.08% moisture and therefore 0.4% of moisture absorbing filter aid was added and thoroughly mixed with the oil, after which the oil was put through a filter press to remove the filter aid as well as the adsorbed moisture to obtain a brilliantly clear oil. This oil was found to have an intense olive flavor and aroma.

*Example II*

The brine obtained from the olives processed in accordance with Example I was added in the amount of 30% to refined deodorized cottonseed oil and put through an homogenizer. From the homogenizer the combination went through an oil separator, leaving the oil with a highly intensified olive flavor.

*Example III*

The brine obtained in accordance with the procedure of Example I was admixed in an amount of 40% with refined deodorized corn oil and there was then added to the combination 1% of dry degerminated crude corn oil. The combination was thoroughly agitated for a period of 15 minutes after which the oil was separated from the brine by a centrifuge clarifier and filter aid was added to the oil followed by filtration in accordance with the procedure of Example I. An extremely highly intensified olive flavor and aroma were obtained in the oil.

*Example IV*

Ripe olives as removed from the trees were held in a 50° salometer brine for 10 months after which the brine was removed and used for processing in accordance with the procedure outlined in Example I, giving a highly intensified olive flavor and aroma to the oil.

The brine and the oil may be agitated for any desired period although where thorough agitation is resorted to, a period of agitation of from 1 minute to 10 minutes is all that is required to give the desired flavor and aroma characteristics. Where homogenization is resorted to, the process may be continuous and the brine may be homogenized with the oil followed immediately by separation as by the use of an oil clarifier or centrifuge.

Enzyme activators may be included in the brine, particularly in the form of the metallic salts and preferably by the use of the higher valence salts such as aluminum chloride. These salts may be added with sodium chloride in the amount of 1 to 25 parts per million or more. Any of the salts or agents which provide enhancement of enzymic activity will produce the desired effect upon the olives and upon the brine to produce a brine that may be utilized in accordance with the procedures of the present invention, involving somewhat shorter periods of curing and a more intensified olive flavor in the final oil product.

Even where a scum or mold growth is present on the brine during the curing period, this scum or mold growth need not necessarily be removed when the brine is utilized for admixture with the oil, although it is preferable to utilize the brine free of the scum or mold.

Faster complete curing may be obtained by adding to the brine such materials as lactate or citrate salts of, for example, copper, iron, cobalt, etc.

The ripe olives which are fully cured in accordance with the procedures herein set forth may specifically be identified as olives which before curing will yield upon expression at least about 30 gallons per ton of olive oil and desirably about 40 gallons per ton of olive oil.

The olives may also be cured in brine to which is added other enzymes that increase the enzyme reaction of the olives and develop a faster reaction within the olives or develop a faster enzymic reaction of the brine so that the brine is more highly useful in accordance with the procedures of the present invention.

Together with or in lieu of a refined vegetable oil or glyceride oil, there may also be employed mineral oil desirably or approximately the same viscosity as olive oil or vegetable oils which may be admixed with the brine of the enzyme reacted or fully cured ripe olives as indicated herein and used in accordance with the procedures as set forth to develop a highly desirable olive flavor and aroma.

The brine which is removed from the enzyme activated or fully cured ripe olives may be concentrated or dehydrated where desired. In other words, the brine may be removed from the fully cured ripe olives and subjected to a vacuum evaporation to over 20% total solids as, for example, to 40% or more total solids and this brine in concentrated form may then be utilized for admixture with the oil followed by separation of the brine which is now substantially devoid of oil soluble constitutents. Where the brine is obtained in one part of the country it may be shipped to another part of the country in evaporated or dehydrated form. Dehydration may be resorted to as by spray drying or drum drying or other usual procedure of dehydration or by evaporation preferably under reduced atmospheric pressure and the concentrated or evaporated brine made in another part of the country may be diluted with water before admixture with the oil in order to give the same or similar water content to the original brine as removed from the enzyme activated olives.

The brine may also be subjected to distillation procedures as, for example, by distilling the brine into refined deodorized oil in order to develop the flavor in the oil by the distillation procedure, leaving the oil solubles of the brine in the oil. The distillation may be conducted by the direct method of distilling into refined deodorized oil or fractional distillation of the brine or high vacuum distillation of the brine may be resorted to in order to obtain a fraction which is high in olive flavor and the fraction thus obtained high in flavor may be admixed with the oil leaving the oil solubles in the oil and with removal of the water solubles or brine solubles free of the oil solubles.

For example, the brine removed from the fully cured ripe olives may be subjected to a vacuum distillation such as by boiling the brine under reduced pressure and within a temperature range of, for example, between 30° C. and 70° C.

The distillate thus obtained is water white and has a clean and highly desirable olive flavor and aroma, which product has unusual characteristics when employed in the manufacture of a variety of food products.

This water white distillate is free of the impurities, coloring matter and objectionable flavor and aroma constituents of the original brine and, surprisingly, contains not only water soluble constituents but also contains preferential oil and fat soluble constituents.

For example, the distillate separated from the fully cured, ripe olives may be thoroughly agitated with a refined vegetable oil such as refined corn oil, refined cottonseed oil, etc., all of which are desirably in deodorized condition and have little or no flavor of their own, during which agitation process the oil soluble fraction contained in the distillate is transferred into the oil and the distillate freed of the oil solubles may be separated from the oil. The oil thus obtained has a most pronounced and highly desirable, clean and fresh, as well as lasting olive aroma and flavor.

The distillation may be conducted until anywheres from 20% to 85% and preferably from 30% to 60% of the distillable materials of the brine are removed. To the distillate there may be added preservative materials such as salt, vinegar, acetic or other acid, benzoate of soda or other material in order to hold the distillate in satisfactory condition until ready for ultimate use. It is particularly desirable to add common salt to the distillate in an amount of about 7% to 15% by weight while the distillate is awaiting ultimate use.

The distillate with or without salt or other preservative may be added to a glyceride oil in the amount of, for example, from 2% to 50% and desirably in the amount of between 10% and 30% against the weight of the oil. The distillate is desirably thoroughly mixed or agitated with the oil. Where desired, the distillate may be emulsified with the oil as by the use of an homogenizer or colloid mill to give rapid agitation although ordinary agitation is all that is required to produce a satisfactory result and transfer the oil soluble materials contained in the distillate to the oil.

The distillate of the fully cured ripe olive brine may also be used in the manufacture of a mayonnaise or salad dressing to replace part or all of the aqueous fraction of the mayonnaise or salad dressing. The water white distillate will provide in the mayonnaise or salad dressing highly desirable olive flavor characteristics without any of the objectionable features of the original brine.

The following are typical examples of the preparation of olive brine distillates:

Example A 216 grams of brine removed after curing ripe olives in common salt brine for 12 months were distilled under vacuum, catching the distillate in an iced receiver. 10% of salt was added to the distillate. This run was stopped when the brine being distilled was saturated with salt. The following are taken from laboratory notes.

Pressure, 8.6 cm. Hg abs.
Dist., 119.6 gr.—55.3%
Loss, 12.2 gr.—5.64%
Temp., 37.5–51° C.
Residue, 84.2 gr.

Example B 540 grams of the same brine as that used in Example A were steam distilled under vacuum, catching the distillate in an iced receiver. 10% of salt was added to the distillate. This run stopped when about 500 cc. of the distillate was recovered.

Pressure, 25 cm. Hg abs. Temp., 85° C.

Example C 191 grams of the same brine as that used in Example A were distilled under vacuum as in Example A. However, distillation was continued until considerable precipitation had occurred in the original brine being distilled with the following results:

Pressure, 5.6 cm. Hg abs.
Dist., 131.9 gr.—69%
Loss, 3.2 gr.—1.68%
Temp., 35–65° C.
Res., 55.9 gr.

In the case of each of the tests conducted above, the water white distillate was found highly desirable for use in the manufacture of mayonnaise or salad dressing or for admixture with a refined vegetable oil in connection with the procedures herein set forth.

Where desired, the ripe olives used for curing in accordance with the procedure herein set forth may be subjected to a lye treatment as, for example, by placing in a 1.25% sodium hydroxide solution for a period of several hours with aeration. The olives may then be soaked in water without sodium hydroxide, changing three times daily until the lye is thoroughly removed, normally requiring from six to seven days. The olives may then be placed in brine and fully cured in accordance with the procedure herein set forth.

The fully cured ripe olives which have been held in the brine for a period of at least six months may where desired be expressed to remove the oil and aqueous fraction (brine) contained therein. The aqueous fraction or brine thus expressed may, as a result of the enzyme reaction which takes place during the complete curing period, be utilized in accordance with the procedures herein set forth.

The present invention is a continuation in part of application, Serial No. 720,319, filed January 4, 1947, entitled "Olive Brine Treated Food Glyceride Oils."

Having described my invention, what I claim is:

1. A method of making an oil having an intensified olive flavor which comprises curing ripe olives in brine for a period of at least about 6 months, separating the brine from the fully cured ripe olives, mixing the brine with an oil and then separating the oil from the brine.

2. A glyceride oil comprising oil soluble constituents obtained by oil extraction of an aqueous olive brine produced in accordance with the method of claim 1.

3. A method of making a glyceride oil having an intensified olive flavor and aroma which comprises holding ripe olives in a common salt solution of at least about 40° salometer reading for a period of at least about six months and until the olives have been thoroughly and completely cured, removing the brine from the said fully cured ripe olives, agitating the brine thoroughly with a refined vegetable oil and then separating the oil from the brine.

4. A glyceride oil comprising oil soluble constituents obtained by oil extraction of an aqueous olive brine produced in accordance with the method of claim 3.

5. A method of making an intensified olive flavored vegetable oil which comprises immersing ripe olives in a brine of at least about 40° salometer reading for a period of at least about six months, separating the brine from the said fully cured ripe olives, subjecting the said brine to vacuum distillation to obtain a water white distillate having highly intensified olive flavor and aroma characteristics and then mixing the distillate with a vegetable oil.

6. A vegetable oil comprising the oil and water soluble constituents derived from the brine of fully cured ripe olives.

7. A refined deodorized glyceride oil comprising the oil and water soluble constituents derived from the brine of fully common salt brine cured ripe olives.

8. A glyceride oil comprising the oil soluble constituents derived from the brine of fully cured ripe olives, said ripe olives having been cured in the brine for a period of at least about six months.

9. A deodorized vegetable oil containing oil recoverable constituents derived from the olive brine of fully cured ripe olives.

10. A deodorized glyceride oil containing the oil soluble constituents of the brine of cured ripe olives, said cure being formed by immersing ripe olives in a brine of at least about 40° salometer reading for a period of at least about six months.

11. A method of enhancing the flavor of flavorless glyceride oils which comprises placing ripe olives in a sodium chloride brine solution for a period of at least about six months to allow them to cure completely while at the same time an enzymic reaction takes place, said brine containing oil solubles of highly desirable characteristics that can be imparted to flavorless glyceride oils, removing the said brine from the olives at the close of the curing period, agitating the brine thoroughly with a flavorless glyceride oil and then separating the oil from the brine.

12. A method of enhancing the flavor of flavorless glyceride oils which comprises placing ripe olives in a sodium chloride brine solution of at least 40° salometer reading for a period of at least about six months to allow them to cure completely while at the same time an enzymic reaction takes place, said brine containing oil solubles of highly desirable characteristics that can be imparted to flavorless glyceride oils, removing the said brine from the olives at the close of the curing period, agitating the brine thoroughly with a flavorless glyceride oil and then separating the oil from the brine.

13. A method of enhancing the flavor of flavorless glyceride oils which comprises placing ripe olives in a sodium chloride brine solution of at least 40° salometer reading for a period of about one year to allow them to cure completely while at the same time an enzymic reaction takes place, said brine containing oil solubles of highly desirable characteristics that can be imparted to flavorless glyceride oils, removing the said brine from the olives at the close of the curing period, agitating the brine thoroughly with a flavorless glyceride oil and then separating the oil from the brine.

14. A method of enhancing the flavor of flavorless glyceride oils which comprises placing ripe olives in a sodium chloride brine solution of at least 40° salometer reading for a period of at least about six months to allow them to cure completely while at the same time an enzymic reaction takes place, said brine containing oil solubles of highly desirable characteristics that can be imparted to flavorless glyceride oils, removing the said brine from the olives at the close of the curing period, emulsifying between about 10% and 50% of the brine with between about 90% and 50% of a flavorless glyceride oil and then separating the glyceride oil by centrifugalization.

15. A method of enhancing the flavor of flavorless glyceride oils which comprises placing ripe olives in a sodium chloride brine solution of at least 40° salometer reading for a period of at least about six months at a temperature of about 85° F. to 95° F. to allow them to cure completely while at the same time an enzymic reaction takes place, said brine containing oil solubles of highly desirable characteristics that can be imparted to flavorless glyceride oils, removing the said brine from the olives at the close of the curing period, agitating the brine thoroughly with a flavorless glyceride oil and then separating the oil from the brine.

16. A method of enhancing the flavor of flavorless glyceride oils which comprises placing ripe olives in a sodium chloride brine solution of at least 40° salometer reading for a period of at least about six months to allow them to cure completely while at the same time an enzymic reaction takes place, said brine containing oil solubles of highly desirable characteristics that can be imparted to flavorless glyceride oils, removing the said brine from the olives at the close of the curing period, agitating the brine thoroughly with a flavorless glyceride oil at an elevated temperature of at least about 160° F. and then separating the glyceride oil by centrifugalization.

17. A method of making an intensified olive oil flavored vegetable oil which comprises immersing ripe olives in a 45° sodium chloride brine for a period of 8 months to allow the olives to become fully cured while maintaining the brine at such salometer reading, removing the brine from the fully cured ripe olives, mixing the brine with a refined deodorized corn oil in the proportion of 20 parts of the brine to 100 parts of the corn oil, agitating for 10 minutes, centrifuging to separate the oil from the brine, adding filter aid to the oil and filtering to obtain a brilliantly clear oil having an intensified olive flavor and aroma.

18. A method of making an intensified olive oil flavored vegetable oil which comprises immersing ripe olives in a 45° sodium chloride brine for a period of 8 months to allow the olives to become fully cured while maintaining the brine at such salometer reading, removing the brine from the fully cured ripe olives, mixing the brine with a refined deodorized corn oil in the proportion of 40 parts of the brine to 100 parts of the corn oil, adding to the combination 1% of a dry degerminated crude corn oil, agitating for 10 minutes, centrifuging to separate the oil from the brine, adding filter aid to the oil and filtering to obtain a brilliantly clear oil having an intensified olive flavor and aroma.

19. A method of making an intensified olive oil flavored vegetable oil which comprises immersing ripe olives in a 50° sodium chloride brine for a period of 10 months to allow the olives to become fully cured while maintaining the brine at such salometer reading, removing the brine from the fully cured ripe olives, mixing the brine with a refined deodorized corn oil in the proportion of 40 parts of the brine to 100 parts of the corn oil, adding to the combination 1% of a dry degerminated crude corn oil, agitating for 10 minutes, centrifuging to separate the oil from the brine, adding filter aid to the oil and filtering to obtain a brilliantly clear oil having an intensified olive flavor and aroma.

20. The oil soluble and water soluble, leached constituents derived and separated from the brine of fully brine cured ripe olives, said constituents being completely dissolved in a deodorized vegetable oil.

SIDNEY MUSHER.

REFERENCES CITED

The following references are of record in the file of this patent:

UNITED STATES PATENTS

| Number | Name | Date |
|---|---|---|
| 2,221,404 | Musher | Nov. 12, 1940 |
| 2,411,201 | Forkner | Nov. 19, 1946 |